3,676,120
SIDE OPERATED DRAWBOLT FOR TOOL-
CARRYING SPINDLE
Leonard Nelson and Thomas Wilson, Trumbull, Conn., assignors to Custom Tool & Machine Co., Inc., Bridgeport, Conn.
Filed Feb. 26, 1971, Ser. No. 119,177
Int. Cl. B23c 5/26
U.S. Cl. 90—11 A       6 Claims

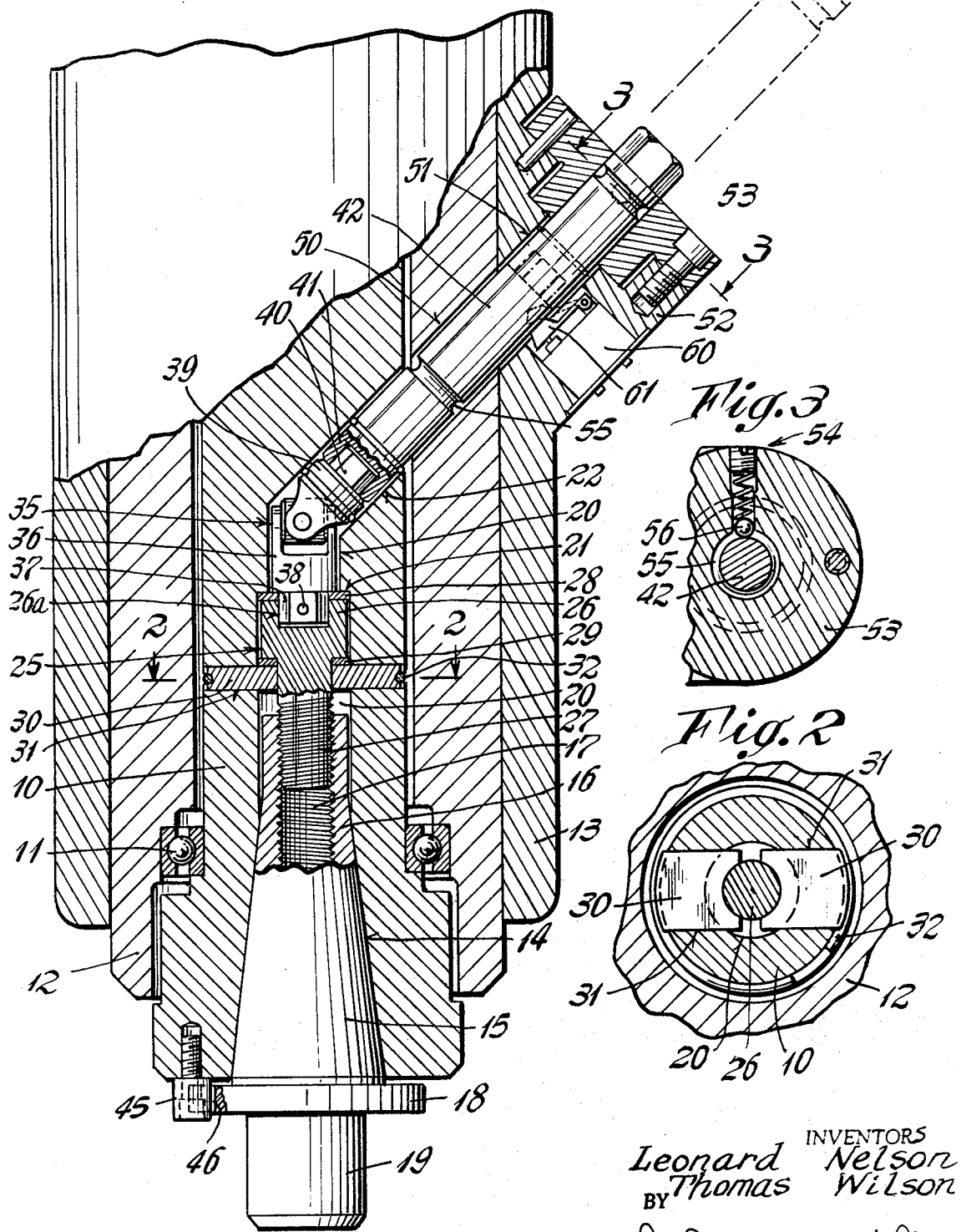

ABSTRACT OF THE DISCLOSURE

A simplified drawbar means for eliminating the use of the long drawbar unit extending through the spindle and providing a side actuated device for turning a tool mounting bolt in the spindle by means of a universal joint. The device which is extremely simple and can be easily assembled is contained in the end of the spindle near the work so that it is readily available for actuation. It is particularly useful in machine tools having a vertically disposed spindle since it provides a short drawbar with a side actuator therefor which is conveniently located adjacent the tool-carrying end of the spindle for drawing the tool carrier into position.

---

Heretofore, tool carriers have been drawn into position in a socket in the end of a rotary spindle by means of elongate drawrods or drawbars which extended through the spindles. With the advent of larger machines, particularly those having vertically disposed spindles, the drawbar has become very long and difficult to reach and operate to secure or release tools. Efforts to solve the problem have involved the use of gearing for drawing the tool into position but these have been complicated or too extensive to be practical.

The present invention overcomes these difficulties by providing a spindle, preferably a vertically disposed spindle for a machine tool, having a tool-carrying conical socket at one end and side actuated drawbolt for mounting or demounting a tool carrier in said socket, said actuator for the drawbolt being conveniently located adjacent the tool-carrying end of the spindle.

This is accomplished by merging the usual conical tool-carrying socket in the end of the spindle with a short axial bore communicating with an angularly disposed bore extending to the side of said spindle and by rotatably mounting a drawbolt having a head disposed in said axial bore and a threaded portion in said scoket and by employing a universal joint with one part drivingly connected to the head of said drawbolt and disposed in said axial bore and a second part disposed in said angularly disposed bore to receive a turning tool inserted from the side of the spindle for rotating said universal joint and the drawbolt to draw a tool carrier into said socket to mount and/or remove a tool carrier on said spindle.

The invention is particularly useful in a machine tool such as a milling machine having a vertically disposed spindle rotatable in a vertically adjustable quill slidable in a machine housing as it enables the operator to quickly mount or change a tool from a point convenient to the working area of the machine.

A feature of the invention resides in the simplicity of the construction, the ease of its assembly and operation, and the convenience of its location for use by an operator of the machine.

If desired means can be provided to prevent rotation of the spindle while the turning tool is in operating position.

Other features and advantages of the invention will be apparent from the specification and claims when considered in connection with the accompanying drawings in which:

FIG. 1 is a fragmentary view of a machine tool spindle, partly in section, showing the present invention.
FIG. 2 is a sectional view taken on line 2—2 of FIG. 1.
FIG. 3 is a sectional view taken on line 3—3 of FIG. 2.

While the invention is applicable to tool holding spindles of various types, it is herein illustrated as applied to a vertically disposed spindle 10 rotatably mounted by bearings 11 in a vertically slidable quill 12 carried by a housing 13 of a machine tool, such as a milling machine or the like. The end of the spindle has a tapered socket 14 to receive and center a similarly tapered shank 15 on the tool carrier 16. The shank has an axially threaded bore 17 in the end thereof as shown in FIG. 1 and the tool carrier has a flange 18 and a projecting suitable tool holder indicated at 19.

The spindle has a short axial bore 20 merging at one end with the end of the socket 14 and having a shoulder 21 therein, said axial bore at the other end communicating with a lateral bore 22 extending to the side of the spindle 10.

A drawbolt 25 having a head 26 is rotatably carried by the axial bore and has a threaded portion 27 projecting into position to engage the threaded bore 17 in the tool carrier 16 to cause movement of the tool carrier on the spindle in response to rotation of said drawbolt. The bolt is rotatively positioned in the axial bore 20 by a washer 28 which engages the upper face of the head and abuts the shoulder 21. The head is held in this position in the spindle by a washer 29 which engages the underface of the head and is engaged by inserts 30 which are inserted through slots 31 (FIGS. 1 and 2) in the spindle and under the washer 29 after the bolt is put in position in the spindle. Preferably the inserts are held in position by an annular spring retainer 32.

The present invention provides a simple means, such as a plural-part universal joint 35, for rotating the drawbolt. As shown in FIG. 1, the head 26 of the drawbolt is provided with a recess 26a. One part 36 of the universal joint is drivingly connected to said head, preferably by having a projection 37 adapted to be received in said recess 26a. If desired, a cross-pin 38 can connect the head 26 and projection 37 together.

A second part 39 of said universal joint is disposed within the lateral bore 22 communicating with the bore 20 and has a projecting stud 40 adapted to receive a recessed driving portion 41 of a turning tool or wrench 42 inserted in the bore 22 from the side of the spindle.

With the head 26 held against longitudinal movement with respect to the spindle by the washers 28, 29, rotation of the drawbolt will cause the threaded portion of the bolt to draw in or expel the tool carrier from the spindle.

If desired, the spindle and tool carrier can be drivingly connected together by a threaded stud 45 carried by the spindle and disposed in a notch 46 in the flange 18 as shown in FIG. 1.

When the spindle is rotatably mounted in the quill 12 slidable in the housing 13 as shown in FIG. 1, the quill is provided with a lateral bore or aperture 50 adapted to be aligned with the bore 22 in the spindle and with a lateral bore 51 in a housing enlargement 52 adjacent the end of the spindle and mounting bearing 53 slidably carrying and supporting the turning tool 42.

The turning tool is normally held in a retracted position with the driving portion disposed in the housing. It is normally held in this position, as shown in dot-and-dash lines in FIG. 1, by a detent 54 engaging a groove 55 in the tool. Such a detent can be a spring-pressed ball 56 as shown in FIG. 3.

When it is desired to mount or remove a tool carrier, the bores 22, 50 and 51 are aligned and the turning tool or wrench is slid inwardly until the driving portion 41 thereof drivingly engages the stud 40 of the second part of the universal joint. Rotation of the turning tool will rotate the drawbolt through the universal joint and cause the threaded portion 27 to act on the threads 17 in the shank to draw in or expel the tool carrier from the socket.

If desired, means can be provided for preventing actuation of the spindle while the turning tool is in operating position. As herein illustrated, this comprises a normally closed electrical switch 60 connected in the control circuit of the machine. The switch is mounted on the housing 52 and has an actuator 61 in position to be engaged by the turning tool or wrench 42 as it is slid inwardly to the full line position of FIG. 1 to open the driving circuit for rotating the spindle.

The structure of the present invention is extremely simple and can be easily assembled in the bores 20, 22 which can be readily formed in the spindle. To accomplish this assembly the part 36 of the universal joint is secured to the head 26 of the drawbolt and washer 28 on the upper face of the head by having its projection 37 disposed in the recess 26a of the head and preferably pinned thereto by cross-pin 38. Washer 29 is positioned on the drawbolt against the underface of the head. The assembled drawbolt and universal joint are then inserted through the socket until washer 28 engages shoulder 21 in the bore 20. In this position, the head 26 is disposed in the bore 20, the part 36 of the universal joint is disposed in bore 20, and part 39 is disposed in the bore 22. When the assembly is so positioned in the spindle, the inserts 30 are put into position through the slots 31 in the spindle, as shown in FIGS. 1 and 2, and are held therein by the spring retainer 32. The assembly of the drawbolt and spindle being completed, the spindle is then inserted into the quill in the housing in the usual manner.

It will be seen, therefore, that the present invention is simple, yet easily operated, is readily assembled and is highly convenient in that the actuator for the drawbolt is located adjacent the tool-carrying end of the spindle and in position for the operator to manipulate it to mount or change tools carried by the spindle.

Variations and modifications may be made within the scope of the claims and portions of the improvements may be used without others.

I claim:

1. A tool-carrying spindle having a tapered socket at the end thereof to receive and center a similarly tapered shank of a tool carrier, said socket merging with an axial bore provided with a shoulder therein and communicating with an angularly disposed bore extending to the side of said spindle, a rotatable bolt having a head disposed in said axial bore and a threaded portion thereof projecting into said socket to engage said shank, a universal joint disposed in said bores and having one part drivingly connected to said head and having a second part located in said angularly disposed bore and provided with means for receiving a turning tool, whereby rotation of said second part by the turning tool causing rotation of said bolt to draw said shank of the tool carrier into operative position on said spindle.

2. The invention as defined in claim 1 wherein means are provided for retaining the head of said bolt in said axial bore.

3. The invention as defined in claim 1 wherein there is a washer between one face of said head of the bolt and said shoulder, a second washer disposed against the other face of the head of the bolt, and inserts carried by said spindle and engaging said second washer to maintain said bolt in position within said spindle.

4. The invention as defined in claim 3 wherein said inserts are maintained in the spindle by an annular retaining ring.

5. The invention as defined in claim 1 wherein means are provided to prevent rotation of said spindle while the turning tool is in position.

6. In a machine tool having a vertical tool-carrying spindle rotatably mounted in a vertically adjustable quill carried by a housing on said machine tool, said tool-carrying spindle having a tapered socket at the end thereof to receive and center a similarly tapered shank of a tool carrier, the improvement wherein said socket merges with a cylindrical bore provided with a shoulder therein and said cylindrical bore communicating with an angularly disposed bore extending to the side of said spindle to be aligned with an aperture in said quill and a lateral bore in said housing, a rotatable bolt having a head disposed in said cylindrical bore and a threaded portion thereof projecting into said socket and adapted to be operatively connected to said shank, a universal joint disposed in said bores and having one part drivingly connected to said head and having a second part located in said angularly disposed bore and provided with means for receiving a turning tool, said turning tool being slidably mounted in said housing and adapted to pass through said aperture in the quill and into driving relation with said second part of the universal joint, whereby rotation of said second part by the turning tool causing rotation of said bolt to draw said shank of the tool carrier into operative position on said spindle.

References Cited

UNITED STATES PATENTS 2,374,919    5/1945    Bruseth _____ 90—11 A

GIL WEIDENFELD, Primary Examiner

U.S. Cl. X.R.

408—239